United States Patent Office 3,840,587
Patented Oct. 8, 1974

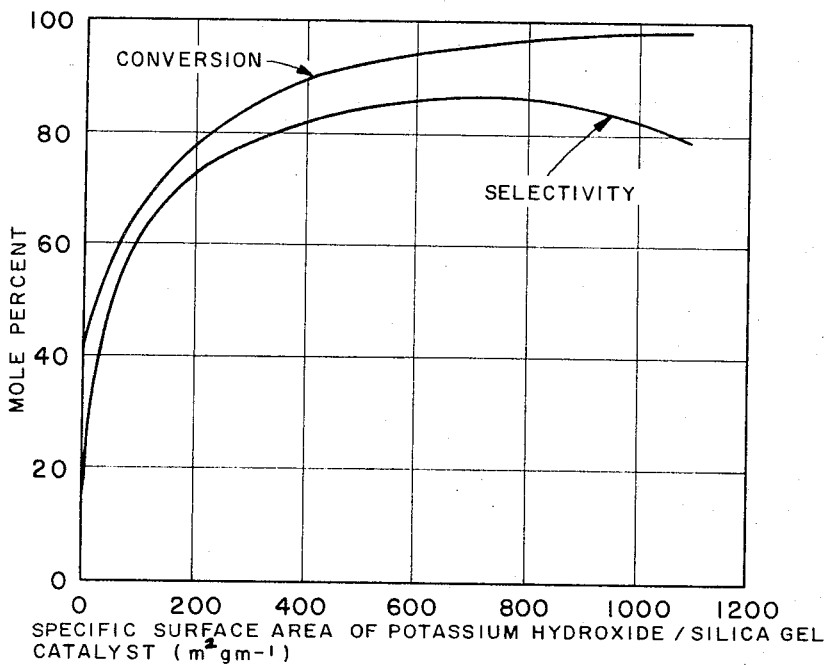

3,840,587
PROCESS FOR THE CONDENSATION OF FORMAL-
DEHYDE WITH CARBOXYLIC ACIDS
Anthony J. C. Pearson, Maryland Heights, Mo., assignor
to Monsanto Company, St. Louis, Mo.
Filed Aug. 3, 1972, Ser. No. 277,720
Int. Cl. C07c 69/54
U.S. Cl. 260—486 D      10 Claims

ABSTRACT OF THE DISCLOSURE

This invention relates to improvements in processes for the vapor phase condensation of formaldehyde with saturated carboxylic acids having at least two carbon atoms. The said processes are carried out at temperatures of from 400° C. to 600° C., in the presence of a catalyst consisting of a Group IA metal compound associated with a silica gel support and having a specific surface area of from 350 to 1000 meter$^2$ gm.$^{-1}$.

---

This invention relates to improvements in processes for the production of α-β ethylenically unsaturated compounds by the catalytic vapor phase reaction of formaldehyde and saturated carboxylic acids having at least two carbon atoms.

α-β ethylenically unsaturated acids, for example acrylic and methacrylic acids, are used extensively in the manufacture of synthetic polymers and other applications, for example as surface coatings and as transparent panels used as windows. Previously, it has been taught (U.S. Pats. 3,051,747; U.S. Pat. 3,247,248) that formaldehyde may react with carboxylic acids having at least two carbon atoms to produce α-β ethylenically unsaturated acids. It has also been known (U.S. Pat. 3,100,795) that α-β ethylenically unsaturated esters may be formed when formaldehyde reacts with carboxylic acids having at least two carbon atoms, in the presence of an alcohol. Materials which are known to catalyze the reactions include alkali and alkaline earth metal hydroxides, oxides or alkanoates supported on alumina, alkaline or alkaline earth aluminosilicates, alkali or alkaline earth hydroxides supported on silica gel. However, the processes of the prior art suffer from serious disadvantages which are greatly minimized in the processes of the present invention.

The process as described in U.S. Pat. 3,051,747 is much inferior to the present processes in that yields are low (5 to 11%) and the major product for their process is not an α-β unsaturated compound but is actually a symmetric ketone. Ketones are not formed in the processes of the present invention.

The process described in U.S. Pat. 3,100,795 and U.S. Pat. 3,247,248 are also inferior to the processes of the present invention. Quite unexpectedly it has been found that alkaline catalysts of unusually high surface area, preferably having a specific surface area of 350 to 1000 m.$^2$ gm.$^{-1}$, perform in a much superior manner for the present processes with respect to conversion and selectivity relative to conventional catalysts. For example when a silica gel is used as a commercial catalyst support it typically has a specific surface area of around 300 m.$^2$ gm.$^{-1}$. In direct contrast the novel catalyst systems of the present invention utilize silica gels which have specific surface areas as high as 1000 m.$^2$ gm.$^{-1}$. The improved catalyst formulation has several quite unexpected effects. Whereas in the prior art typical temperatures of operation fall in the range 325° C. to 425° C., the preferred temperature range for the processes of the present invention unexpectedly is 400° C. to 600° C., but more preferably 430° C. to 500° C.

The combined effect of the novel, improved catalyst system, and higher preferred temperatures of the present invention is that feed dilution mole ratios (ratio of saturated carboxylic acid to formaldehyde) considerably lower than used in the prior art may be employed in the processes of the present invention. The use of lower saturated acid to formaldehyde ratios is a significant improvement over the prior art and thus provides improved and more economically and commercially feasible processes with far less recycle of expensive components and simpler purification. Moreover the improved catalysts of the present invention result in improved selectivities at the preferred temperatures in comparison with selectivities obtained at the temperature ranges quoted in the prior art.

A further improvement has also been found to result from strict control of the water content of the reaction system, a parameter not recognized by previous workers in this field. It is preferable to maintain water content in the feed such that the mole ratio of water to formaldehyde is from 0.01 to 10.0, but more preferably 0.1 to 5.0.

An object of the present invention is to provide improvements in the vapor phase process for the condensation of formaldehyde with saturated carboxylic acids having at least two carbon atoms to form α-β ethylenically unsaturated acids.

A further object of the present invention is to provide improvements in the vapor phase process for making α-β ethylenically unsaturated esters, especially methyl methacrylate, by the catalytic vapor phase reaction of formaldehyde with saturated carboxylic acids having at least two carbon atoms in the presence of a lower alkanol. For example methyl methacrylate is made by the condensation of propionic acid with formaldehyde and methanol.

It is another object of this invention to provide improved processes as above in which the aforesaid vapor phase reactions are effected using approximately equimolar quantities of formaldehyde and a saturated carboxylic acid having at least two carbon atoms, in the presence of catalytic amounts of Group IA alkali metal hydroxides or oxides, but preferably of potassium, rubidium or cesium, with potassium being most preferred.

In addition to hydroxides or oxides, other alkali metal compounds may be used when preparing the catalyst. These compounds can be applied to the catalyst support as carbonates, nitrates, sulphates, phosphates, and other inorganic salts or acetates, propionates or other carboxylates. Alkaline earth metal compounds may also be used if desired, e.g. calcium, magnesium and barium compounds.

It is a further object of this invention to provide a process for the condensation of formaldehyde with saturated carboxylic acids as described above in approximately equimolar quantities in the presence of catalytic amounts of potassium hydroxide or oxide and the other alkaline compounds on silica or silica gel, as preferred carriers.

The improved processes of the present invention have been found to result from the use of novel catalysts having high specific surface areas (as measured by the BET method, e.g. S. Brunauer, et al JACS, 60, 309 (1938)). In general, silicas and silica gels when used as catalyst supports in typical catalytic processes have specific surface areas in the range of a fraction of 1 meter$^2$ gm.$^{-1}$ to around 300 meter$^2$ gm.$^{-1}$. In contrast to this, it has been found that high area silicas and silica gels are preferable supports for this process. Catalysts having surface areas preferably in the range of 350 to 1000 meter$^2$ gm.$^{-1}$ have been found to give results superior to prior practice. This quite unexpected finding is demonstrated graphically in the drawing herewith. It can be clearly seen that optimum conversion and selectivity are obtained from the use of potassium hydroxide/silica gel catalysts of unusually high specific surface areas.

Although the high area silica gels and silicas are the preferred solid catalyst supports for the processes of the present invention, the high area aluminas, silica-aluminas, thorias, magnesias, silicates and other such materials known to those skilled in the art may also be used.

Further improvements of the present invention have been found to result from the use of reaction temperatures which are higher than those which have been employed by previous workers in this field. Since the reaction of formaldehyde and carboxylic acids is carried out in the vapor phase, the temperature employed must be sufficient to maintain the reactants in the vapor phase, and at which reaction occurs, but should not exceed temperatures at which substantial decomposition of the particular reactants and reaction products occurs. Whereas in the prior art typical temperatures of operation fall in the range 325° to 425° C., the preferred temperatures for the processes of the present invention unexpectedly are 400° to 600° C. and more preferably 430 to 500° C. It has been found that the use of higher temperatures greatly improves the selectivity of the process towards the production of the desired unsaturated products while avoiding competing reactions such as the disproportionation of formaldehyde to formic acid and methanol (Cannizzaro reaction).

It is a principal advantage of the present invention over the prior art that high conversion and selectivity can be maintained while employing lower feed mole ratios of saturated carboxylic acid to formaldehyde. In the present processes it is found that ratios of carboxylic acid to formaldehyde of from 0.1:1 to 7.5:1, but more preferably 1:0:1 to 5.0:1 may be employed. The use of lower saturate to formaldehyde mole ratios is a significant improvement over the prior art as in commercial operation this improvement allows more economical operation with less recycle and simplified purification requirements.

A further improvement of the present invention is the unexpected discovery that water concentration plays an important role in the control of selectivity and conversion. It has been found that under completely anhydrous conditions the reaction proceeds at a negligible rate. At high molar feed ratios of water to formaldehyde, e.g. 15 to 1, poor selectivities result. Desirable water to formaldehyde ratios are in the range 0.01:1 to 10:1, but more preferably 0.1:1 to 5.0:1.

In the case where the condensation reaction is carried out in the presence of a lower alkanol, resulting in the production of an α-β ethylenically unsaturated ester, it is generally preferable to utilize from about 1:1 to 5:1 moles of alcohol for each mole of carboxylic acid in the feed, but more preferably about 1.5:1 to 3.5:1 moles of alcohol per mole of carboxylic acid. When it is desired to produce a particular mixture of unsaturated acids and their esters, a mole ratio of alcohol/carboxylic acid of less than 1:1 may be used to obtain the desired mixtures of acids and esters.

A first embodiment of the present invention is to provide an improved process for the condensation of formaldehyde with a saturated carboxylic acid having at least two carbon atoms over a catalyst comprising a Group IA compound dispersed on a carrier to produce an α-β ethylenically unsaturated acid, with the improvements of employing a catalyst of high specific surface area, preferably of from 350 to 1000 m.² gm.⁻¹; of operating at a temperature of 400° to 600° C., but more preferably 430° to 500° C.; of using feed mole ratio of water to formaldehyde of from 0.01:1 to 10:1, but more preferably 0.1:1 to 5:1 and of employing a feed mole ratio of carboxylic acid to formaldehyde of from 0.1:1 to 7.5:1, but more preferably 1:0:1 to 5.0:1. The reaction may be represented by the following overall equation:

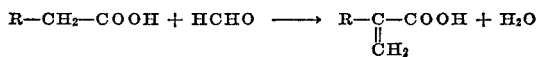

in which R represents hydrogen, a lower alkyl, aryl or cyclic radical of 2 to 8 carbon atoms.

A second embodiment of the present invention is to provide an improved process for the condensation of formaldehyde with a saturated carboxylic acid, having at least two carbon atoms, together with a lower alkanol over a catalyst comprising a Group IA compound dispersed on a carrier to produce an α-β ethylenically unsaturated ester. The said improvements comprise employing a catalyst of high specific surface area, preferably of from 350 to 1000 m.² gm.⁻¹; operating at a temperature of from 400° to 600° C., but more preferably from 430° to 500° C.; using a feed mole ratio of water to formaldehyde of from 0.01:1 to 10:1, but more preferably 0.1:1 to 5.0:1; and using a feed mole ratio of lower alkanol to carboxylic acid of from 1:1 to 5:1, but more preferably 1.5:1 to 3.5:1. This second reaction may be represented by the following overall equation:

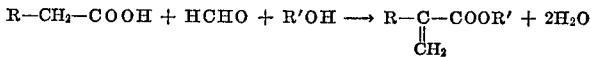

in which R represents hydrogen or a lower alkyl, aryl or cyclic radical; R' represents a lower alkyl radical preferably containing 1 to 8 carbon atoms.

Another embodiment of the present invention is directed to the processes of the first and second embodiments in which catalytic amounts of potassium hydroxide or other Group IA compounds are supported on silica gel, alumina, silicaalumina, thoria, magnesia or other catalyst carriers. The potassium or other alkali content of the catalyst, calculated as the hydroxide is preferably in the range of 0.01 to 10 weight percent of the completed catalysts.

As set forth above, the said saturated carboxylic acids used in the processes of the present invention are converted to α-β ethylenically unsaturated compounds by reaction with formaldehyde or by reaction with formaldehyde and a lower alkanol. Suitable saturated carboxylic acids contain a minimum of two carbon atoms per molecule and may be represented by the formula

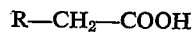

wherein R represents hydrogen or a lower alkyl, aryl or cyclic radical. For the purpose of the present invention the term "lower alkyl, aryl, or cyclic radical" is taken to mean a radical containing a sufficiently low number of carbon atoms, such that the carboxylic acid and product unsaturated compounds will be readily vaporizable without substantial decomposition. Representative carboxylic acids suitable for use in this invention include acetic acid, propionic acid, butyric acid, phenyl acetic acid, etc. In general, acids of at least 2, and preferably of from 2 to 8 carbon atoms are preferred, although acids having more than 8 carbon atoms may also be used if desired.

In the case of the condensation of formaldehyde with a carboxylic acid in the presence of a lower alkanol, representative lower alkanols are methanol, ethanol, isopropanol, ethyl hexanol, etc. In general, alcohols containing from 1 to 8 carbon atoms per molecule are preferred, although higher alcohols may be employed if desired.

The formaldehyde used in the present invention can be of any convenient form. For example, it can be anhydrous paraformaldehyde, trioxane or in the form of an aqueous or alcoholic solution as are available commercially. If desired, the processes may be coupled directly with a process for the manufactureof formaldehyde or its polymers.

The processes of the present invention may be conveniently practiced at atmospheric pressure. However, if it is desired, subatmospheric pressures or superatmospheric pressures may be utilized. Generally, suitable pressures are in the range of from about 1 to about 100 p.s.i.a. The space velocity is preferably maintained within the range 100 to 10,000 litres hr.$^{-1}$ litre of catalyst$^{-1}$.

The reactions are conducted in the vapor phase in the presence of a solid catalyst as has been described. The solid catalyst may be disposed in a tube or on trays or in a fluid bed, etc. through which the reactant mixture is passed. The reactor system may consist of a series of catalyst beds with optional interstage heating or cooling between the beds if desired. The catalyst composition may be varied through the reactor to provide operating advantages. It is also an embodiment of the invention to use either upflow or downflow of the reactants through the reactor, with periodic reversal of gas flow also being contemplated to maintain a clean catalyst bed. If desired, the gaseous feed may be charged together with an inert carrier gas, e.g. nitrogen, helium, argon, carbon oxides or low molecular weight hydrocarbons.

The following examples illustrate representative embodiments of the present invention, but do not limit the scope of the invention.

EXAMPLE 1

A catalyst for the condensation of formaldehyde with propionic acid is prepared in the following manner. 120 gm. of silica gel ($-18+35$ mesh), having a specific surface area of 810 meter$^2$ gm.$^{-1}$ is calcined in a furnace for 4 hours at 500° C. The silica gel is then cooled in a desiccator and then 100 gm. is charged to a rotary evaporator. A solution containing 1.0 gm. KOH is prepared by diluting 2.20 gm. of 45.5% KOH solution to 60 ml. The KOH solution is introduced to the agitating catalyst support and the admixture is dried until free flowing at 26″ Hg vacuum at 90° C. The impregnated catalyst support is then further dried for two hours at 120° C., calcined at 500° C. for 8 hours and then cooled and stored in a desiccator.

A feed solution containing formaldehyde, propionic acid and water is prepared such that the mole ratio of propionic acid to formaldehyde is 4.5 to 1 and the mole ratio of water to formaldehyde is 1.5 to 1. The feed mixture is charged to a head tank and stored under a positive pressure of nitrogen.

A 10 cc aloquot of the catalyst, as prepared, is charged to a tubular reactor whose temperature is held at 110° C. A stream of nitrogen is passed through the reaction tube and the reactor temperature is raised to 430° C. over a period of three hours.

The formaldehyde-propionic acid-water feed is transferred by means of a metering pump to a vaporizer maintained at 225° C. to 250° C. where it is vaporized and mixed with a nitrogen sweep stream flowing at 20 std. cm.$^3$ min.$^{-1}$. The combined feed mixture is passed through a heated line to the tubular reactor whose temperature is maintained at 430° C. The vaporized feed mixture is passed through the catalyst bed at a rate of 800 litre hr.$^{-1}$ litre of catalyst$^{-1}$ (corrected to STP). The reactor effluent is condensed and analyzed by gas chromatography. The analysis indicates 72% of the formaldehyde in the feed to have been consumed over the catalyst and methacrylic acid to have been formed at a selectivity of 78% based on formaldehyde consumed. Analysis of non-condensables by gas chromatography indicates the presence of trace amounts of carbon monoxide, carbon dioxide, hydrogen and propylene in the nitrogen sweep gas.

When the potassium hydroxide component of the catalyst is replaced by lithium, sodium, rubidium or cesium hydroxides or carbonates, similar results are obtained. Supports such as alumina, silica-alumina (50–50 mole percent) of high surface area give like results.

EXAMPLE 2

A 10 cc aliquot of the catalyst prepared in Example 1 is charged to a tubular reactor and heated to 435° C. in a stream of nitrogen. A mixture containing propionic acid, formaldehyde, methanol and water is prepared and charged to a feed tank and is stored under a positive pressure of nitrogen. The said mixture has a composition such that the mole ratio of propionic acid to formaldehyde is 4.5:1; the mole ratio of water to formaldehyde is 2.5:1; and the mole ratio of methanol to propionic acid is 2.5:1. The said mixture is pumped by means of a metering pump to a vaporizer maintained at 225° C. where it is vaporized and mixed with a nitrogen sweep gas which is flowing at 20 std. cm.$^3$ min.$^{-1}$. The combined feed mixture is passed through a heated line at atmospheric pressure to the tubular reactor wherein the catalyst is situated, maintained at a temperature of 430° C. The vaporized feed mixture, which has a flow rate of 895 litre hr.$^{-1}$ litre of catalyst$^{-1}$, is passed over the said catalyst. The reactor effluent is condensed, and analyzed by gas chromatography. The analysis indicates that 78% of the formaldehyde in the feed has been consumed over the catalyst and that methyl methacrylate is present in the condensed product in amounts equivalent to a selectivity of 90% based on formaldehyde consumed. Also present in the condensed product are formaldehyde, methanol, water, methyl propionate and trace amounts of propionic and methacrylic acids. These components are separated from the product methyl methacrylate by extraction and distillation and are suitable for recycle.

EXAMPLE 3

A 10 cc. aliquot of the catalyst prepared in Example 1 is charged to a tubular reactor and heated to 430° C. in a stream of nitrogen. A mixture containing acetic acid, water and formaldehyde is prepared and charged to a feed tank and is stored under a positive pressure of nitrogen. The said mixture has a composition such that the mole ratio of acetic acid to formaldehyde is 4.9:1 and the mole ratio of water to formaldehyde is 2.7:1. The said mixture is transferred by means of a metering pump to a vaporizer maintained at 225° C. where it is vaporized and mixed with a nitrogen sweep gas which is flowing at 20 std. cm.$^3$ min.$^{-1}$. The combined feed mixture is passed through a heated line at 25 p.s.i.a. to a tubular reactor wherein the catalyst is situated, maintained at a temperature of 405° C. The vaporized feed mixture, which has a flow rate of 750 litre hr.$^{-1}$ litre of catalyst$^{-1}$, is passed over the said catalyst. The reactor effluent is condensed and analyzed by gas chromatography. The analysis indicates that 53% of the formaldehyde in the feed has been consumed and that acrylic acid has been formed at a selectivity of 78% based on formaldehyde consumed.

When the acetic acid in the feed is replaced by n-pentanoic acid the reactor effluent is found to contain 2-methylene pentanoic acid (this product is also known as α-propyl acrylic acid).

EXAMPLE 4

A feed solution containing acetic acid, methanol, water and formaldehyde is prepared such that the mole ratio of acetic acid to formaldehyde is 4.5:1; the mole ratio of water to formaldehyde is 0.30:1 and the mole ratio of methanol to acetic acid is 2.7:1. The procedure as described in Example 2 is employed with a reactor temperature of 425° C. and feed rate of 2000 litre hr.$^{-1}$ litre of catalyst$^{-1}$. A conversion of 35% and selectivity of 90% to methyl acrylate are obtained.

When the acetic acid and methanol in the feed are replaced by n-pentanoic acid and isopropanol respectively, similar results are obtained with the isopropyl ester of 2-methylene pentanoic acid being the product formed.

Similarly, when the methanol in the feed is replaced by 2-ethyl hexanol the resultant product is 2-ethylhexyl acrylate. This produce is useful as a component of surface coatings and water dispersible paints.

EXAMPLE 5

The present example demonstrates that the ratio of water to formaldehyde is an important parameter and must be kept within a desired range. The procedure of Example 2 is employed using three water concentrations. The results are shown in Table 1. It can be seen that anhydrous conditions and water to formaldehyde ratios as high as 15:1 have a deleterious effect on selectivity when compared with a water to formaldehyde ratio of 2.5:1.

TABLE I

| Run number | Mole ratio, $H_2O$/HCHO | Temp., °C. | Conversion, mole percent | Selectivity, mole percent |
|---|---|---|---|---|
| 1 | 0 | 425 | 1.5 | 10 |
| 2 | 2.5 | 425 | 70 | 90 |
| 3 | 15 | 425 | 85 | 35 |

EXAMPLE 6

The present example demonstrates that the use of catalysts having high surface area results in superior performance over low area catalysts. The procedure of Example 1 is employed using catalysts of varying surface area, each containing 0.75% potassium hydroxide. Several results are summarized in Table II. In runs 2 and 3 the catalyst carriers employed are silica gels while run 1 utilizes a bonded silica support. The Figure herewith is a plot of conversion and selectivity vs. catalyst specific surface area. As can be seen catalysts having the higher specific surface areas result in much superior performance over those of conventional area.

TABLE II

| Run number | Catalyst area, $m.^2 gm.^{-1}$ | Temp., °C. | Conversion, mole percent | Selectivity, mole percent |
|---|---|---|---|---|
| 1 | 4.0 | 400 | 47 | 56 |
| 2 | 300 | 400 | 75 | 70 |
| 3 | 1,000 | 400 | 82 | 84 |

EXAMPLE 7

The present example demonstrates the desirability of operating at temperatures between 430° C. and 500° C. for the condensation of formaldehyde with propionic acid in the presence of methanol. The procedure described in Example 2 is employed using a catalyst containing 1.0% rubidium carbonate on a silica gel of specific surface area 800 $m.^2 gm.^{-1}$. The feed composition is such that the mole ratio of propionic acid to formaldehyde is 3.3:1; the mole ratio of water to formaldehyde is 5.2:1 and the mole ratio of methanol to propionic acid is 3.2:1. The feed rate is 1100 litre hr.$^{-1}$ litre of catalyst$^{-1}$. Experimental results are summarized in Table III herewith. (In the last run, it is noted that the formaldehyde in the feed is completely converted, but only to the extent of 20% selectivity to methyl methacrylate.)

TABLE III

| Run number | Temp., °C. | Conversion, mole percent | Selectivity, mole percent |
|---|---|---|---|
| 1 | 375 | 20 | 30 |
| 2 | 430 | 55 | 80 |
| 3 | 475 | 70 | 74 |
| 4 | 550 | 100 | 20 |

What is claimed is:

1. In an improved process for the vapor phase condensation of formaldehyde with saturated carboxylic acids having at least two carbon atoms which comprises contacting the said reactants with a catalyst consisting essentially of a compound of potassium, rubidium or cesium dispersed on a solid carrier, the improvements comprising the following conditions:
    (a) the said catalyst having specific surface area of from 350 to 1000 $m.^2 gm.^{-1}$.
    (b) a temperature of operation of from 400° to 600° C.
    (c) a feed mole ratio of carboxylic acid to formaldehyde in the range of 0.1:1 to 7.5:1, and
    (d) a feed mole ratio of water to formaldehyde in the range of 0.01:1 to 10:1.

2. In an improved process for the vapor phase condensation of formaldehyde with saturated carboxylic acids having at least two carbon atoms which comprises contacting the said reactants with a catalyst consisting essentially of a compound of potassium, rubidium or cesium dispersed on a solid carrier, the improvements comprising the following conditions:
    (a) the said catalyst having a specific surface area of from 350 to 1000 $m.^2 gm.^{-1}$.
    (b) a temperature of operation of from 430° to 500° C.
    (c) a feed mole ratio of carboxylic acid to formaldehyde in the range of 1.0:1 to 5.0:1, and
    (d) a feed mole ratio of water to formaldehyde in the range of 0.01:1 to 5.0:1.

3. In an improved process for the vapor phase condensation of formaldehyde with saturated carboxylic acids having at least two carbon atoms and with an alkanol of 1 to 8 carbon atoms which comprises contacting the said reactants with a catalyst consisting essentially of a compound of potassium, rubidium or cesium dispersed on a solid carrier, the improvements comprising the following conditions:
    (a) the said catalyst having a specific surface area of from 350 to 1000 $m.^2 gm.^{-1}$.
    (b) a temperature of operation of from 400° to 600° C.
    (c) a feed mole ratio of carboxylic acid to formaldehyde in the range of 0.1:1 to 7.5:1.
    (d) a feed mole ratio of water to formaldehyde in the range of 0.01:1 to 10:1.
    (e) a feed mole ratio of alkanol to carboxylic acid of 1:1 to 5:1.

4. In an improved process for the vapor phase condensation of formaldehyde with saturated carboxylic acids having at least two carbon atoms and with an alkanol of 1 to 8 carbon atoms which comprises contacting the said reactants with a catalyst consisting essentially of a compound of potassium, rubidium or cesium dispersed on a solid carrier, the improvements comprising the following conditions:
    (a) the said catalyst having specific surface area of from 350 to 1000 $m.^2 gm.^{-1}$;
    (b) a temperature of operation of from 430° to 600° C.;
    (c) a feed mole ratio of carboxylic acid to formaldehyde in the range of 1.0:1 to 5.0:1.
    (d) a feed mole ratio of water to formaldehyde in the range of 0.01:1 to 5.0:1;
    (e) a feed mole ratio of alkanol to carboxylic acid of 1.5:1 to 3.5:1.

5. Process as in Claim 1 to produce methacrylic acid in which the said carboxylic acid is propionic acid.

6. Process as in Claim 1 to produce acrylic acid in which the said carboxylic acid is acetic acid.

7. Process as in Claim 3 to produce methyl methacrylate in which the said carboxylic acid is propionic acid and the said alkanol is methanol.

8. Process as in Claim 3 to produce methyl acrylate in which the said carboxylic acid is acetic acid and the said alkanol is methanol.

9. Process as in Claim 1 in which the said catalytic compound is potassium hydroxide.

10. Process as in Claim 1 in which the catalyst is potassium hydroxide on silica gel.

References Cited

UNITED STATES PATENTS 3,535,371  10/1970  Wolf, et al. _____ 260—486

FOREIGN PATENTS 785,100  10/1957  Great Britain _____ 260—486 R

OTHER REFERENCES

C. H. Collier (Edt.), Catalysis in Practice, pp. 11–17 (1957).

LORRAINE A. WEINBERGER, Primary Examiner

P. J. KILLOS, Assistant Examiner

U.S. Cl. X.R.

252—454; 260—468 L, 469, 476 R, 514 L, 515 R, 526 N